No. 874,140.  
PATENTED DEC. 17, 1907.  
B. VALIQUET.  
APPARATUS FOR CONVERTING, STORING, AND UTILIZING WIND POWER.  
APPLICATION FILED JUNE 15, 1906.

2 SHEETS—SHEET 1.

Witnesses.  
W. C. De Long  
C. A. Adams

Inventor:  
Benjamin Valiquet,  
per  
Charles Turner Brown,  
Attorney.

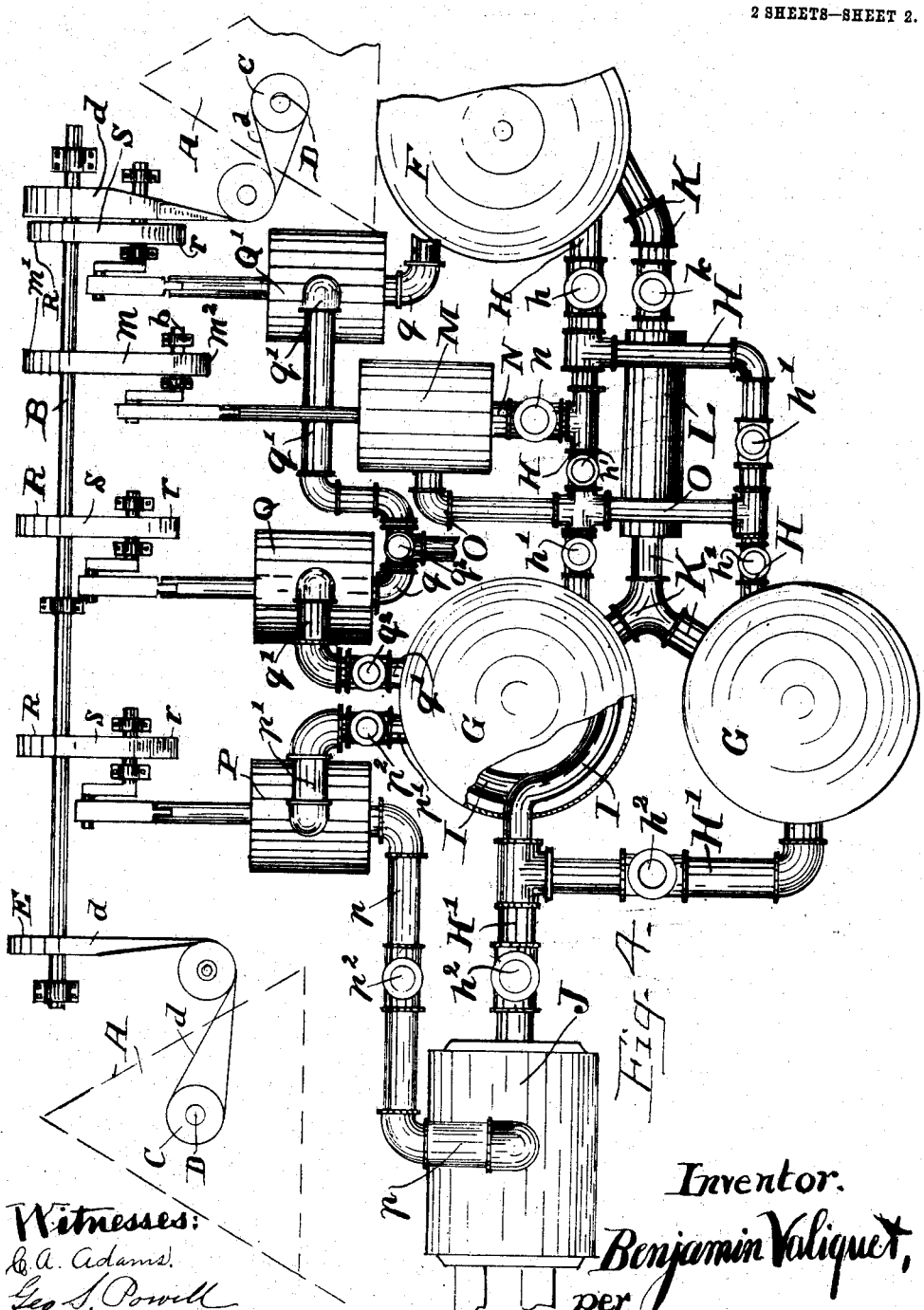

UNITED STATES PATENT OFFICE.

BENJAMIN VALIQUET, OF CHICAGO, ILLINOIS.

APPARATUS FOR CONVERTING, STORING, AND UTILIZING WIND-POWER.

No. 874,140.　　　Specification of Letters Patent.　　　Patented Dec. 17, 1907.

Application filed June 15, 1906. Serial No. 321,840.

To all whom it may concern:

Be it known that I, BENJAMIN VALIQUET, a citizen of the United States, and a resident of Chicago, in the county of Cook and State of Illinois, have invented certain new and useful Improvements in Apparatus for Converting, Storing, and Utilizing Wind-Power, of which the following, when taken in connection with the drawing accompanying and forming a part hereof, is a full and complete description, sufficient to enable those skilled in the art to which it pertains to understand, make, and use the same.

My invention relates to apparatus for storing air by wind power by means of successive compressions, and for transmitting and utilizing the same.

The object of the invention is to obtain mechanisms by means of which air stored under pressure may be economically used and the used air returned to the storage pressure tank; and to obtain mechanisms by means of which such stored air may be made to actuate machinery.

The invention is embodied in the several constructions illustrated in the drawing referred to, in which Figure 1 is an elevation of such apparatus including a plurality of wind motors forming elements thereof. Fig. 2 is an elevation, on an enlarged scale, of the apparatus embodying this invention, with the wind motors not shown. Fig. 3 is a top plan view of the several parts of the apparatus which are illustrated in Fig. 2. Fig. 4 is a top plan view, on an enlarged scale, of the several parts of the apparatus embodying this invention.

A reference letter applied to designate a given part is used to indicate such part throughout the several figures of the drawings wherever the same appears.

A, A, are wind motors.

B is a shaft driven by wind motors A, A. Any number of wind motors desired or required may be used to drive shaft B.

C, C, are driving wheels on the rotatable shaft D of the wind motors and d, d, are cables transmitting motion from driving wheel C on shaft D to wheels E on shaft B.

F is a storage tank for compressed air. G, G, are also storage tanks for air under pressure.

H is a branched pipe from storage tank F extending from such storage tank into the respective storage tanks G, G, and there forming the coils I, I.

h is a valve in pipe H.

J is an engine. The pipe H forming coils I, I, in storage tanks G, G, is continued from such coils respectively, (lettered H'), to the engine J.

h', h' are valves in the respective branches of pipe H, and h², h², are valves in pipe H'.

K is a pipe communicating with storage tank F at one end thereof and with storage tank G at the other end thereof.

k is a valve in pipe K.

L is a condenser in pipe K used to remove moisture in the air which flows from tank G into tank F. The pressure in tank F is less than the pressure in tank G and air will flow from such tank G through pipe K into tank F.

M is a pump actuated by belt m passing over driving wheel m' on shaft B and over driven wheel m² on counter shaft b.

N is an inlet pipe to pump M, such inlet pipe communicating with pipe H and is provided with valve n thereto. O is the outlet pipe of pump M, also communicating with pipe H between valve h and coil I in the respective tanks G, G, and with a valve h' between it and inlet N.

In this apparatus the engine J is actuated by air from the storage tank F flowing through pipe H, one of the coils I and pipe H'; and to obtain greater pressure in such air in the engine J than obtains in the same quantity of air delivered from the storage tank F and also to raise the temperature of the air from the storage tank F before it is delivered to the engine, such air is warmed in the coil I. For this reason such air is at times forced into the coil by means of pump M, the valves h and n being open and suitable ones of valves h', h', closed; and at other times such air in the tank F is delivered directly into the coils (without use of pump M) and warmed by air forced into tanks G, G, (or the one thereof in use) around the coil, by compressors P, Q, or one thereof.

P and Q are, respectively, air compressors forcing air into pressure tank G around the coil I when there is sufficient wind to rotate wind motors A, A, under the load of such compressors. At other times one only of the compressors may be actuated by the motors A, A, and at still other times it may occur that neither of the compressors P, Q, are actuated by the wind motors A, A, and that the the pump M only is actuated thereby. As the air is compressed in compressors P and Q the temperature thereof is raised and the effect thereof upon the coil I and its contents is to raise the temperature thereof.

p is a pipe from the exhaust of engine J to compressor P and p' is the pipe from compressor P to tank G. $p^2$, $p^2$, are valves on pipes p, p', respectively. When both valves $p^2$, $p^2$, are opened and the compressor P is actuated by the wind motors the exhaust air from engine J is drawn into compressor P and forced therefrom into tank I by such wind motors H, H. q is a pipe which may at its inlet end communicate with the discharge end of another air compressor (Q', Fig. 4), so that the air compressor Q is the last one of a series of air compressors, the first one of such air compressors receiving the air from the atmosphere and compressor Q, being the last one of the series, discharging through pipe q' into one of the tanks I.

$q^2$ is a valve in pipe q'.

The compressors P and Q are driven by shaft B by means of driving wheels R, R, belts S, S, and driven wheels r, r, respectively.

The operation of the device is as follows:—
The wind motors A, or some of them, are put into action and air is compressed, as by compressor Q, and stored in storage tank F, such air passing through pipe q', one of the tanks G, G, pipe K and condenser L. Air in tank F being under sufficient pressure valve h, is turned and such air is admitted to the one of the coils I, either directly or by way of pipe N, pump M and pipe O (in which case the valves h' which are in pipe H between pipe O and inlet N, are closed and valve n is opened), and valve $h^z$ is opened to admit such air to the engine J, to operate the same. Such air is discharged from the exhaust valve of the engine into pipe p and from thence flows to waste or into the compressor P and by such compressor is forced into the tank G. The air forced into the tank G by the several compressors P, and Q (or one of them), is at a higher temperature than is the air in the coil I and hence the temperature of the air in the coil I is raised as it passes through such coil and the pressure thereof is thereby increased. When there is a very light wind, or the pressure in tank F is unusually light it may occur that as the pressure of the air in the coil I is increased by the rise in the temperature thereof, the valve h' adjacent to valve h is closed and the pump M is put into action so that the air in pipe H adjacent to the storage tank F is drawn from such pipe by the pump M and forced through pipe O from the pump M back into pipe H adjacent to tank G and into the coil I.

The several compressors and pump M are all actuated by the shaft B and the several wind motors are all connected to such shaft B to actuate it, and as many of such motors and compressors are used as the velocity of the wind prevailing permits or requires. The power of the engine J, may, however be kept constant as a surplus of air under pressure may be obtained in tank F by the running of the wind motors during the night or other hours when engine J is not in use. The engine J is used to run any machinery desired, as say a creamery or a machine shop.

A plurality of tanks G are preferably used by me and such tanks are employed alternately to receive the discharge from the air compressors P, Q and to supply air under pressure from the coil I therein to the engine J.

It will be observed that the pressure in the tanks is nearly equal, the pressure in tanks G being enough greater than that in tank F to cause a flow from such tanks G into tank F—while the pressure in the coil and in the engine is considerably less than is the pressure in tank F; and the difference in pressure is obtained and maintained by partially opening the valves h, or h' so that enough air is not discharged therethrough to permit the pressure in the coil I in either one of the tanks G, G, in view of the use of air from the coil by the engine, to equalize with the pressure in such tank F. And this is true although the air in the coil is warmed by the air in tank G so that an increase in pressure of the air in the coil is obtained while such air is in the coil by such warming.

For instance assume the pressure in tank F is one hundred pounds per square inch and that the pressure of air in the engine is sixty pounds per square inch. In such case valves h and h' may be opened so as to maintain say forty pounds pressure in the coil, while the engine is operating and drawing its supply from such coil; and the air in the coil is being heated by the contents of tank G and because of such heating twenty pounds of pressure is added to the air in the coil—so maintaining sixty pounds pressure in the coil; forty thereof supplied from tank F and twenty from heat applied to coil I in tank G. The pump M would not, in the above described operation be used. In case however the pressure in tank F is lower than the pressure in coil I, before the coil and contents are heated, the pump M will force air from tank F into coil I and thereafter air will be forced into tank G by compressors P, Q and the pressure of the air in the coil will be increased. In the meantime air is being forced into the additional coil I in additional tank G; and when the pressure in the first coil is sufficiently reduced by the supply therefrom to the engine J air from the second coil is used. The use of the coils I, I, is therefore, in such case, alternate.

The pump M is not designed to be often used.

Having thus described my invention what I claim is new and desire to secure by Letters Patent is;—

1. The combination of a storage tank, a supplemental tank in communication with the storage tank, a coil in the supplemental tank, an engine, such coil in communication with the storage tank by means of a restricted passage way and in communication with the inlet port of the engine, a compressor in communication with the exhaust port of the engine and with the supplemental tank, a wind motor, a rotatable shaft, a connection between the wind motor and the rotatable shaft and a connection between the rotatable shaft and the compressor, substantially as described.

2. The combination of a storage tank, a supplemental tank in communication with the storage tank, a coil in the supplemental tank, an engine, such coil in communication with the storage tank by means of a restricted passage way and in communication with the engine, a compressor in communication with the exhaust port of the engine and with the supplemental tank, a wind motor and a connection between the wind motor and the compressor; substantially as described.

3. The combination of a storage tank, a plurality of wind motors, a supplemental tank, and an engine with means to apply force generated by the wind motors to the air discharged from the exhaust ports of the engine and to deposit such air, under pressure and while the temperature thereof is raised by such pressure above climatic temperature, in the supplemental tank, means to convey air from the storage tank to the inlet port of the engine and to subject such air, between such storage tank and such inlet ports to the compressed air at its raised temperature, means to limit the supply of air from the storage tank to the coil, and means to apply force generated by the wind motors to air at atmospheric pressure and to deposit such air under pressure and while the temperature thereof is raised by such pressure in the supplemental tank; substantially as described.

4. The combination of a plurality of wind motors, a shaft, means to drive the shaft by the combined action of the several motors which are in operation, a storage tank, a supplemental tank, a coil in the supplemental tank, an engine, a plurality of compressors, a conduit from the storage tank to the supplemental tank, conduits from the discharge ends of a plurality of compressors to the subplemental tank, a conduit from the storage tank to the coil, such conduit provided with a restricted opening therein, and provided with a by pass, a pump interposed in the bypass and means to cut out the by-pass, and a conduit from the coil to the inlet port of the engine; substantially as described.

5. The combination of a supply tank to contain air under pressure, an additional tank also arranged to contain air under pressure, a pipe communicating with the tanks, a coil in the additional tank, an engine, a pipe communicating with the first named tank and with the coil and a pipe communicating with the coil and with the inlet of the engine, compressors, pipes respectively communicating with the discharge pipe of the compressors and with the additional tank, a pipe communicating with the exhaust port of the engine and with the inlet of one of the compressors, and means to force air from the first named supply tank through the coil; substantially as described.

BENJAMIN VALIQUET.

In the presence of—
 CHARLES TURNER BROWN,
 CORA A. ADAMS.